UNITED STATES PATENT OFFICE.

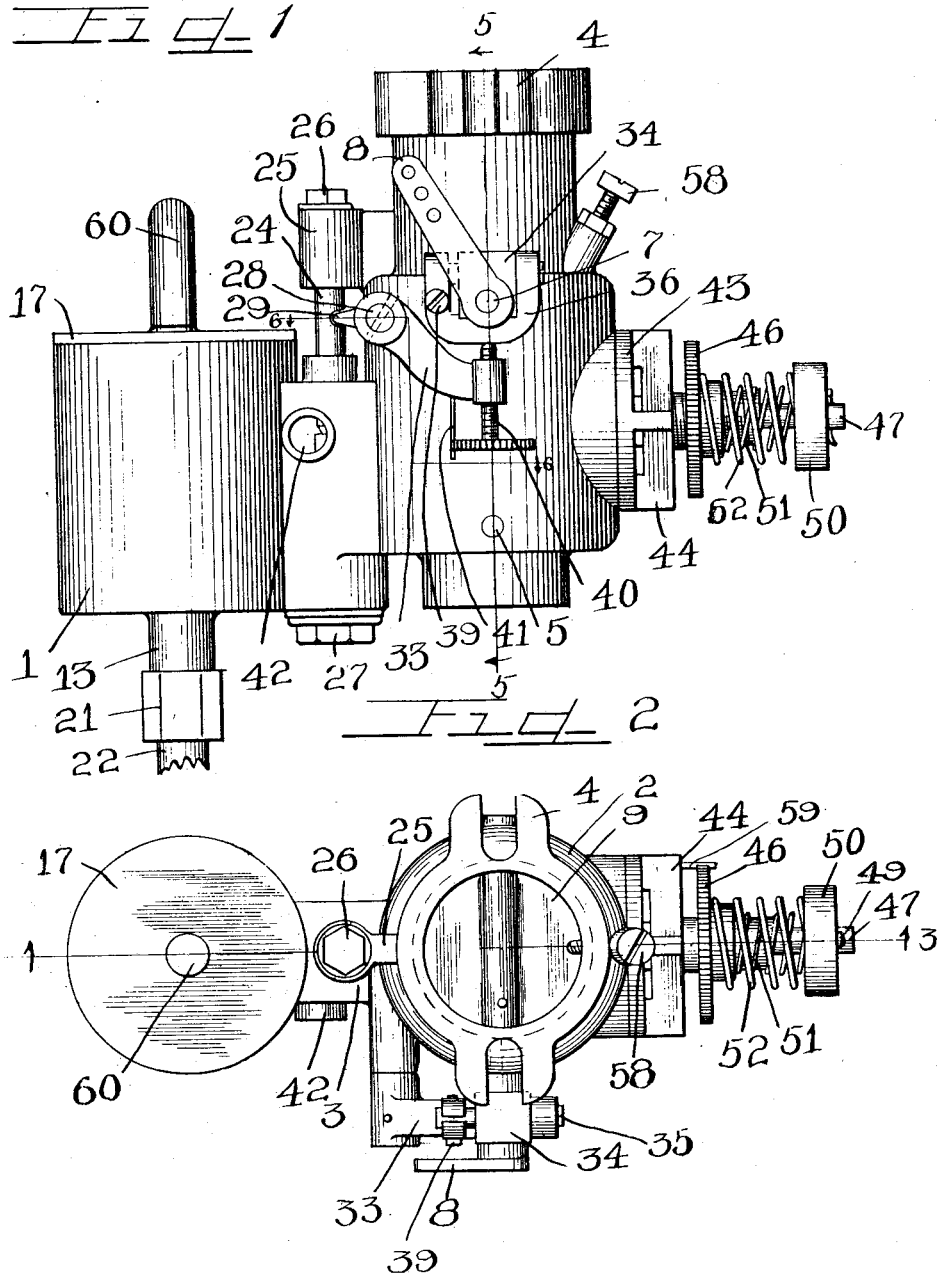

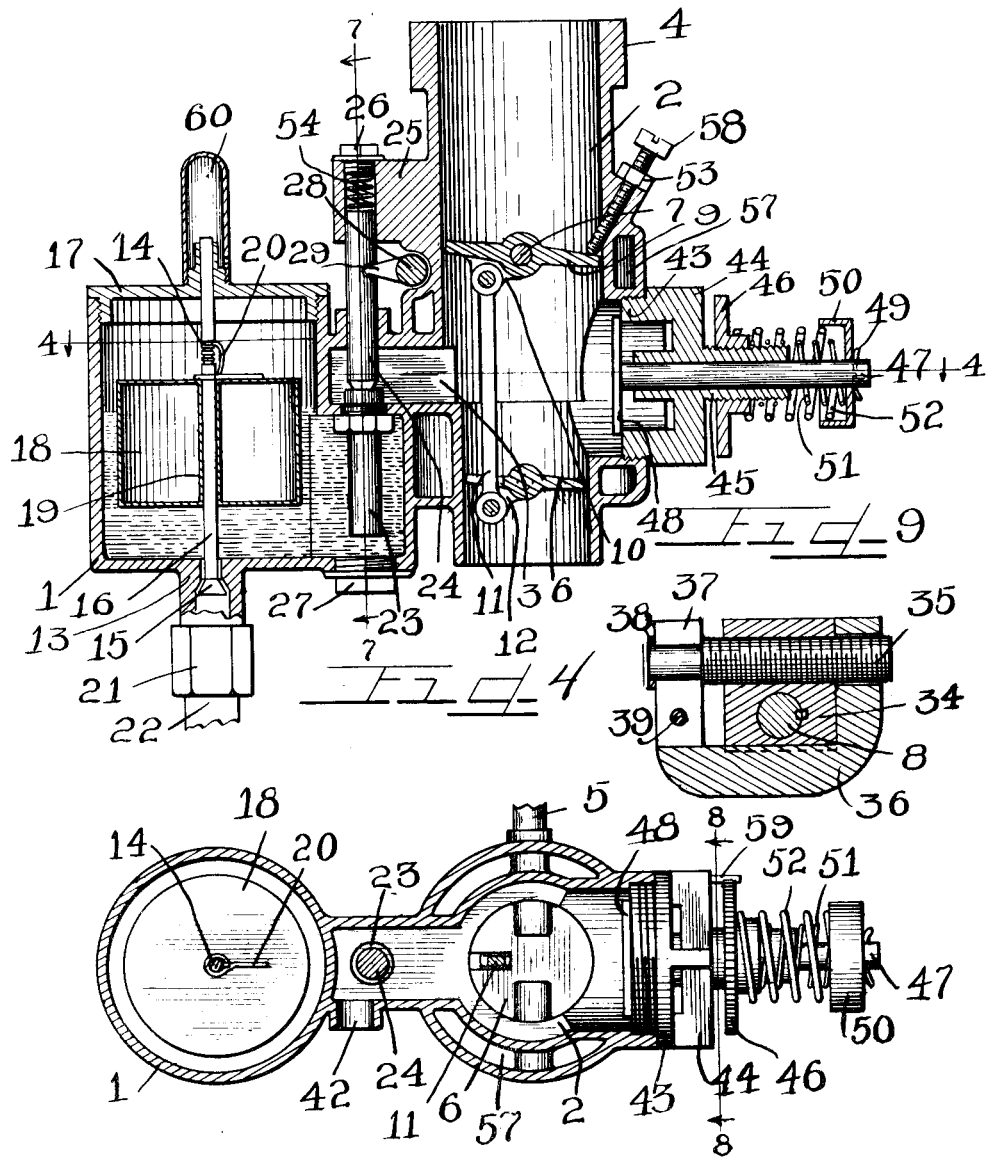

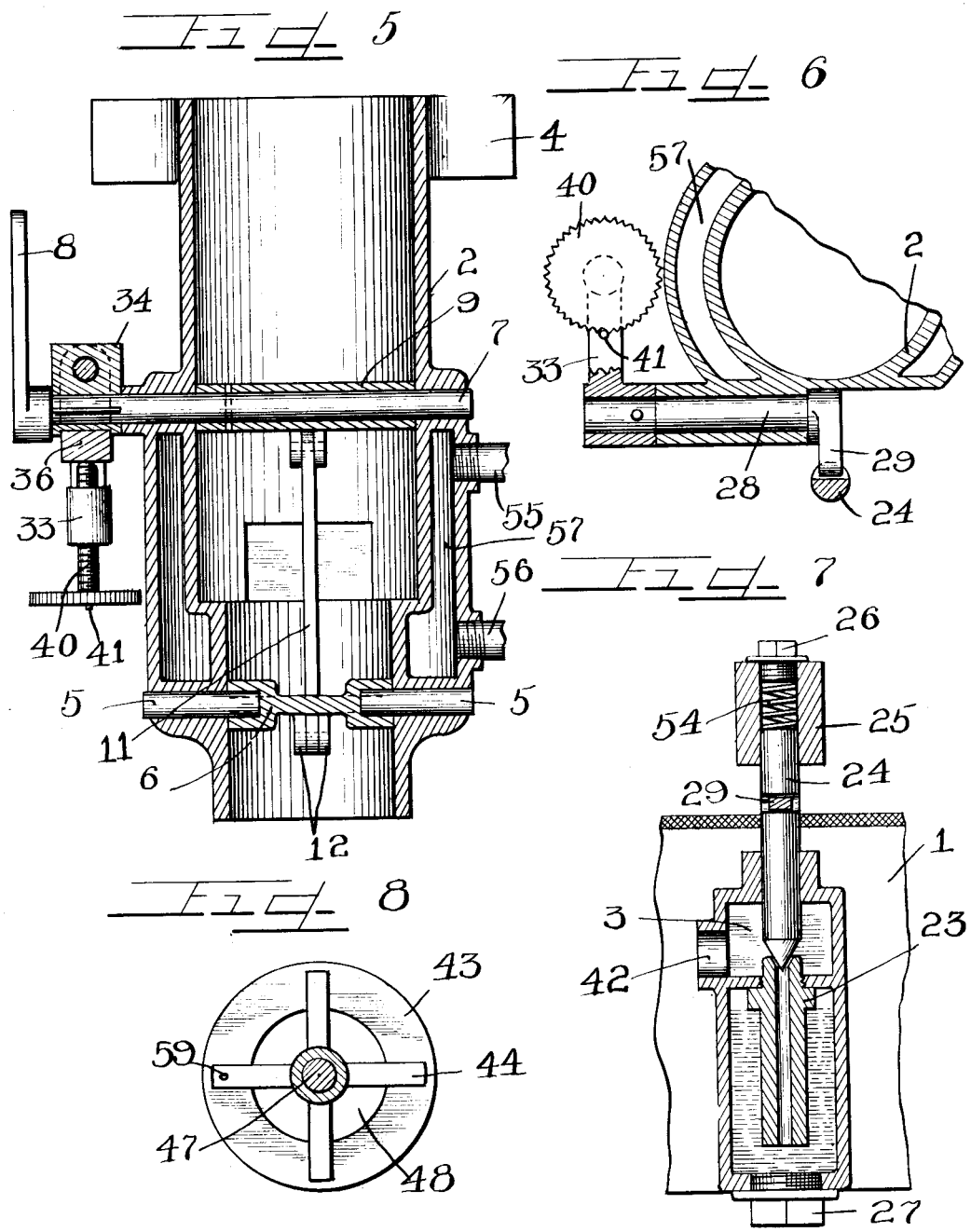

CHARLES L. RAYFIELD, OF CHICAGO, ILLINOIS, ASSIGNOR, BY DIRECT AND MESNE ASSIGNMENTS, OF ONE-THIRD TO CHARLES W. FINDEISEN AND ONE-SIXTH TO HERBERT E. KROPF, BOTH OF CHICAGO, ILLINOIS, AND ONE-THIRD TO FINDEISEN & KROPF MFG. CO., A CORPORATION OF ILLINOIS.

CARBURETER.

1,193,820.   Specification of Letters Patent.   Patented Aug. 8, 1916.

Application filed December 8, 1909. Serial No. 532,114.

*To all whom it may concern:*

Be it known that I, CHARLES L. RAYFIELD, a citizen of the United States, and a resident of the city of Chicago, in the county of Cook and State of Illinois, have invented certain new and useful Improvements in Carbureters; and I do hereby declare that the following is a full, clear, and exact description of the same, reference being had to the accompanying drawings, and to the numbers of reference marked thereon, which form a part of this specification.

This invention relates to that class of carbureters adapted for use in supplying the explosive fluid to hydro-carbon engines.

The object of the invention is to afford a carbureter adapted to permit the automatic regulation of air and hydro-carbon vapor simultaneously and to afford a construction in which the mixing chamber is maintained at approximately a constant temperature by jacketing the same with hot water.

It is also an object of the invention to afford a construction in which a supply of hydro-carbon vapor is at all times under perfect control, and in which, although the flow of hydro-carbon is regulated to the air inlet, nevertheless an automatic air inlet valve is provided which affords an additional supply of air in passing from low to high speed.

It is also an object of the invention to afford an auxiliary air inlet adjacent the induction aperture for the hydro-carbon and which assists in spraying the hydro-carbon into the mixing chamber and affords a sufficient inlet to maintain the combustion when the carbureter is throttled to permit operation of the engine at the lowest speed.

It is also an object of the invention to afford a float feed carbureter of the class described in which flooding is practically impossible, and in which is embodied an inlet valve, the closure for which is operatively connected and simultaneously adjusted with the air valves.

It is also an object of the invention to afford an automatically acting spring controlled air inlet valve in which the first inward or initial inlet movement is accomplished with but slight resistance but in which further movement is accomplished against much greater resistance and in which also the spring tension may be varied to permit the device to be set in accordance with the requirements for use.

It is also an object of the invention to afford a device of the class described of the utmost simplicity and durability of construction and in which all parts are easily accessible for purposes of adjusting, cleaning or repair.

The invention consists in the matters hereinafter described and more fully pointed out and defined in the appended claims.

In the drawings: Figure 1 is a side elevation of a device embodying my invention and with the throttle lever in low speed position. Fig. 2 is a top plan view thereof. Fig. 3 is a section on line 3—3 of Fig. 2. Fig. 4 is a section on line 4—4 of Fig. 3. Fig. 5 is an enlarged section on line 5—5 of Fig. 1. Fig. 6 is an enlarged section on line 6—6 of Fig. 1. Fig. 7 is an enlarged section taken on line 7—7 of Fig. 3. Fig. 8 is an enlarged section on line 8—8 of Fig. 4, with parts omitted. Fig. 9 is an enlarged sectional detail of the cam.

As shown in the drawings: Said carbureter embraces a casting of suitable metal comprising, as shown, a cylindric float feed chamber 1, and a mixing chamber 2, the casings for which are integrally connected, affording a passage 3, therebetween which communicates with both the float feed chamber and the mixing chamber. As shown, the casing for said mixing chamber is cylindric and tubular and is provided at its upper end with a flange 4, slotted radially to receive the bolts therein whereby the same is rigidly secured to a suitable fitting or connection leading to the inlet ports of the engine, and which for convenience is not shown. The bore of said mixing chamber is somewhat reduced below the passage 3. Extending transversely through the wall of the mixing chamber are pivot pins 5, at the lower end thereof, on which is pivotally engaged the butterfly valve closure 6, and above and parallel said pivot pins is an actuating shaft 7, which extends through said casing and on the outer end of which is engaged a throttle lever 8.

Rigidly secured on said shaft 7, is a butterfly valve 9, corresponding with, and, as shown, parallel the butterfly valve 6. On the under side of the butterfly valve 9, and eccentric with the shaft is a boss 10, and pivotally connected thereon and extending through the lower butterfly valve 6, on the side adjacent the float feed chamber is a connecting link 11, which is pivotally engaged on a boss or arm 12, integral with said lower valve so that both valves are adjusted correspondingly simultaneously.

The float feed chamber, as shown, is cylindric and is provided centrally on its bottom with an integral inlet pipe 13, which is bored to afford an inlet passage, said passage is restricted in its upper end and suitably shaped to afford a downwardly facing valve seat. Extending into said passage is a stem 16, provided on its inner or lower end with a rounded head or closure 15, which may be of German silver or other suitable material to resist corrosion. Said stem is of a length to extend upwardly through said float feed chamber and through the cover 17, which is threaded on said chamber.

Within the chamber is the float 18, which may be of any material suitable for the purpose. It is shown as a sheet metal float affording an air chamber therein and through the axis of which extends a sleeve 19. Said stem 16, fits in and extends through said sleeve and is provided above the same with a plurality of peripheral grooves 14, as shown in Fig. 3, in any of which may engage a spring detent 20, secured on the float, thereby permitting the relative adjustment of said rod or stem and float. As shown, the pipe 13, on said float feed chamber is threaded to receive the union 21, whereby the hydro-carbon supply pipe 22, is connected therein and which, of course, leads to a suitable source of hydro-carbon supply. Said float feed chamber extends laterally beneath the passage 3, through which the same is connected with the mixing chamber and as shown, a threaded aperture is tapped in the lower wall of said passage 3, and in alinement with a corresponding aperture in the bottom of the float feed chamber, as shown in Fig. 3, and threaded in the bottom wall of said passage is the eduction pipe 23, through which the hydro-carbon is delivered into said passage. Said pipe in its upper end is provided with a conically concave seat complemental with the conical lower end of a needle valve closure 24, which is slidably secured in the top wall of said passage to permit the same to be adjusted vertically to vary the admission of hydro-carbon to said passage and mixing chamber.

As shown, an integral bracket 25, is provided on the side of the mixing chamber, and the upper cylindric end of said needle valve closure slidably engages therein. A screw plug 26, is provided above said closure in said bracket and a spring 54, is seated in said bore to hold the closure down. Correspondingly a screw plug 27, is threaded in the aperture in the bottom of the float feed chamber in alinement with the eduction tube 23 to permit said float feed chamber and said pipe to be readily cleaned and to permit the assembling of the device by the insertion of said eduction tube 23, therethrough.

Means are provided for simultaneously adjusting the supply of hydro-carbon to the supply of air to afford the proper explosive mixture under the varying conditions of load. For this purpose, as shown, a shaft 28, is journaled transversely on the mixing chamber between the same and the valve closure 24, and is provided with an arm 29, which engages in a notch or seat in the side of the needle valve 24. Rigidly secured on said shaft 28, in any suitable manner is a lever 33, which, as shown in Fig. 1, projects obliquely downward to a point beneath the end of the shaft 7.

Rigidly secured on the outer end of the shaft 7, and as shown, at the inner side of the arm 8, is a rectangular block 34. Threaded transversely therethrough above the shaft is a screw shaft 35, the ends of which extend through and are freely rotatable in opposite sides of a slidably adjustable cam 36, as shown in Fig. 9. Said cam comprises a substantially rectangular block of steel milled out from its upper side to receive the block 34, therein and to afford sufficient space for lateral adjustment. Both ends of the cam thus formed are apertured to receive the ends of the screw shaft 35, therethrough and the end 37, is split longitudinally through said bore therein to enable said screw shaft to be rigidly engaged when the adjustment is made. At said end the screw shaft is of course, turned to smaller size and is unthreaded and is provided on the outer end with a fillet 38, which bears against the outer side of the cam. A jam screw 39, is provided at said split end to clamp the cam on the screw shaft. The outer lower corners of the cam are rounded off so that the side remote from the needle valve has a relatively long sweep eccentric to the shaft 7. Fitted into the free extremity of the arm 33, is a set screw 40, provided with a milled head which is engaged by a locking pin 41, whereby said set screw is at all times held in adjusted position with its point bearing against said eccentric or cam.

An auxiliary constantly open air port 42, is provided through one of the side walls of the passage 3, as shown in Figs. 1 and 4. This, as shown, is circular in cross section and is directed toward, and slightly at the rear of the needle valve so that the air flowing inwardly therethrough with considerable force owing to the relatively small size of said port, assists in spraying the hydrocarbon mixture and in carrying the same into the mixing chamber. The size of this port is sufficient to maintain the air supply when the engine is operating at its lowest speed.

An automatic auxiliary air valve opening into the mixing chamber is provided on the side thereof opposite the passage 3. For this purpose, as shown, the casing for the mixing chamber is provided with a relatively large and internally threaded aperture therethrough in which is threaded an annular valve seat 43, the inner face of which affords the seat and on the outer side of which is a raised integral spider 44. Integral with the axis of the spider is a hub or sleeve 45, the outer end of which is externally threaded to receive the hubbed adjusting nut or follower 46, which is milled peripherally and a pin 59, set in one of the arms of the spider 44, engages the follower and firmly holds the same in the adjusted position. Extending through the hub or sleeve is a valve stem 47, on the inner end of which is rigidly engaged the valve closure 48, which seats on said ring 43, to close the valve. Secured on the outer end of the stem by means of a cotter pin 49, is an inwardly flanged cup 50, and secured therein and bearing against the hub of the adjusting nut or follower 46, is a relatively weak spring 51, which acts weakly to resist the opening of said air valve. Bearing against the follower or adjusting nut 46, is a strong spring 52, which normally fits somewhat loosely in said cup and is inert until the valve 48, has opened somewhat against the tension of the spring 51.

A set screw 58, extends obliquely through the wall of the mixing chamber and engages the valve closure 9, to permit adjustment thereof to afford the requisite supply of mixture for lowest speed of the engine, and as shown, a jam nut 53, is provided to rigidly secure the same in adjusted position.

The operation is as follows: Having connected the carbureter suitably with the motor and a source of supply for the hydro-carbon, the set screw 58, is adjusted to hold the butterfly valve in the mixing chamber to afford a sufficient supply of the mixture for lowest speed of the engine. The set screw 40, is also adjusted to bear against the substantially horizontal face of the cam 36, on the throttle shaft 7, sufficiently to lift the needle valve against the pressure of the spring 54, to afford the requisite hydro-carbon supply for low speed. Having found the right feed supply, and throttle adjustment for low speed, the cam 36, previously set at full retard (as shown in Figs. 1 and 9), is adjusted laterally by means of its screw shaft to afford the requisite supply of hydro-carbon for high speed. Such adjustment does not in any manner affect the previous low speed adjustments inasmuch as the under face of the cam is relatively straight for a sufficient distance to permit the utmost adjustment of the cam laterally without varying the needle valve until the throttle is changed. When an adjustment of said cam is found that permits quick opening of the throttle from lowest to highest speed without back firing, the cam is locked on its shaft 35, by means of the jam screw 39. Before attaining perfect adjustment it may be necessary to regulate the air intake through the air valve 48. This is accomplished by setting up or by releasing the adjusting nut 46, dependent on whether more or less air supply is required. This varies the tension on the spring 51, and also varies the degree of opening of said valve before the spring 52, is brought into play. The quality of the mixture may, of course, be varied by adjustment of the adjusting nut at any time. No other adjustment need ever be made after the device is first properly adjusted to the engine. The air inlet port 42, and the opening in the lower butterfly valve which are open at all times affords a sufficient air supply at the slowest speed of the engine. The air inlet port 42, from its position insures the rapid delivery of the hydro-carbon in the form of a fine spray or vapor partly mixed with air into the mixing chamber.

The utmost facility of access to all parts is afforded by the construction and should dirt or dust find its way into the mixing chamber, it can in no case clog any of the valves or affect the operation of the device. The quantity of hydro-carbon contained in the float feed chamber at all times, of course, depends on the regulation of the float on the valve stem 16. This is accomplished as before described by adjusting the stem upwardly or downwardly in the sleeve 19, this being readily accomplished by means of the detent engaging in the appropriate groove in the stem. A cap 60, is threaded on the central apertured boss on top of the cover 17, to inclose the upper end of the stem and is apertured below the top of the boss to permit air inlet, but prevent the admission of dust to the float feed chamber.

The construction described affords the utmost perfection of adjustment and the readiest possible access for cleaning or repair. A hot water jacket 57, surrounds the mixing chamber and passage from the float feed chamber. Said jacket may be supplied from the radiator through the pipes 55 and 56, with hot water to maintain a constant temperature in the mixing chamber though this is not essential inasmuch as the device operates excellently without the same.

Of course, I am aware that details of the construction may be varied. I therefore do not purpose limiting this application for patent otherwise than necessitated by the prior art.

I claim as my invention:

1. A carbureter embracing a float feed chamber, a straight open ended mixing chamber, a passage connecting the two, a valve in said passage controlling the flow of fuel thereinto from said float feed chamber, a constantly open air inlet port in said passage and adjacent said valve, and acting to afford an inlet sufficient to carry the hydrocarbon into the mixing chamber.

2. In a device of the class described a float feed chamber, a straight tubular mixing chamber, a passage connecting the two, a needle valve in said passage controlling the flow of fuel thereinto from said float feed chamber, a constantly open horizontally disposed air port slightly at the rear of the valve in said passage, a valve in the eduction passage from the mixing chamber, and mechanism controlling said valves for adjusting the same simultaneously.

3. A carbureter embracing a tubular open ended casing affording a mixing chamber, a float feed chamber, a pipe connecting the same with a source of hydro-carbon supply, a substantially horizontal passage opening into the mixing chamber, a needle valve controlling the feed from the float feed chamber into said passage, a constantly open air port adjacent the needle valve and acting to carry the discharge therefrom into the mixing chamber, connected valves in said mixing chamber above and below said passage, a throttle lever for simultaneously opening said valves in the mixing chamber, and adjustable mechanism operated from said throttle lever to simultaneously adjust the needle valve.

4. A carbureter embracing a float feed chamber, an open ended tubular casing, a part of which affords a mixing chamber, operatively connected and simultaneously acting upper and lower valves affording the upper and lower walls of the mixing chamber, a passage opening from the float feed chamber into said mixing chamber, an adjustable spring pressed needle valve therein, an automatically acting air valve also opening into the mixing chamber between said valves, and operative connections between the needle valve and said valves in the mixing chamber whereby the adjustment of the one produces corresponding adjustment of the other.

5. In a device of the class described a tubular open ended casing affording in part a mixing chamber, upper and lower butterfly valves in said chamber, a link connecting the same eccentrically, and an automatic air valve opening into said casing between the butterfly valves and adjustable means acting to hold said valves from wholly closing.

6. In a device of the class described an open ended mixing chamber, a float feed chamber, a connecting passage between the two, a vertically operating spring pressed needle valve in said passage controlling the flow of fuel thereinto from said float feed chamber, said mixing chamber being straight for its entire length and said connecting passage communicating transversely through the walls thereof, a throttle valve, a lever therefor, operative connections for adjusting the needle valve from the throttle, a constantly open air port opening into said passage at the rear of said needle valve, and a cam actuated by the throttle lever to vary the opening of the needle valve correspondingly with the adjustment of the throttle.

7. In a device of the class described a water jacketed mixing chamber, butterfly valves affording a bottom and top for said chamber, an automatically acting air inlet valve opening between said valves, a weak spring normally controlling the opening of said valve, a strong spring acting to resist opening of the valve after a predetermined opening, a throttle lever for actuating the butterfly valves, a needle valve, a lever for adjusting the same, and a cam adjustable on a part of the throttle mechanism engaging the needle valve lever and acting to adjust the same simultaneously with the throttle.

8. In a device of the class described a carbureter embracing a casing open at its lower end and adapted at its upper end for connection with the induction ports of the motor, a carbureting passage in said casing, an adjustable needle valve controlling the same, butterfly valves above and below said passage, a link eccentrically connecting the same, a throttle lever connected with one of said valves, a lever operatively connected to open and close the needle valve, mutually co-acting means on said throttle lever and adjusting lever for mutually adjusting the degree of opening of the needle valves and butterfly valves and an automatically acting air inlet valve between said butterfly valves.

9. A carbureter comprising a feed chamber, a mixing chamber, a passage affording communication between the chambers provided with an air inlet port, a needle valve controlling the admission of fluid from the feed chamber into the passage, a plurality of butterfly valves forming part of the mixing chamber and a link within the mixing chamber pivotally connected to the valves to adjust the same simultaneously.

10. A carbureter comprising a feed chamber, a mixing chamber, a passage affording communication between the chambers provided with an air inlet port, a needle valve controlling the admission of fluid from the feed chamber into the passage, a plurality of butterfly valves forming part of the mixing chamber, a boss on the underside of each of the valves, a connecting link within the mixing chamber pivotally secured to the bosses for adjusting the valves simultaneously, and mechanism actuated by adjustment of the valves for adjusting the needle valve.

11. A carbureter embracing a float feed chamber, a mixing chamber, an inlet passage connecting the same, a needle valve controlling the feed from the float feed chamber into said passage, a seat in one side of said needle valve, a shaft in the mixing chamber above the inlet passage, a valve secured on said shaft, a valve pivotally arranged beneath the inlet passage, means connecting the valves to move together, a block secured on the outer end of the shaft, a cam comprising a block recessed to receive the aforesaid block and to afford sufficient space for lateral adjustment, means securing the cam in adjusted position, a shaft journaled on the mixing chamber, an arm on said shaft engaging in the seat in the needle valve, a lever having one of its ends secured on said shaft, adjustable means fitted into the free extremity of the lever adapted to bear against the cam, and a throttle lever adapted to simultaneously operate the needle valve in the inlet passage and the valves in the mixing chamber.

12. In a device of the class described, an open ended casing, upper and lower valves in said casing, a link connected to adjust the valves simultaneously, an automatic air valve opening into said casing, a relatively weak spring acting to resist the opening of said air valve, and a strong spring for resisting the opening of the valve after a predetermined opening.

13. In a device of the class described a casing, having a relatively large internally threaded aperture in one side thereof, upper and lower valves in said casing, a link adapted to simultaneously adjust said valves, adjustable means adapted to prevent the valves from completely closing, a valve seat threaded in the aperture in the casing, a raised spider integral therewith, a sleeve integral with the axis of the spider, an adjusting nut threaded on said sleeve, a valve stem extending through the sleeve, a valve closure rigidly secured on the inner end thereof adapted to bear against said seat to close the valve, a cup secured on the outer end of the stem, a weak spring acting to resist the opening of said air valve and a strong spring acting to resist the opening of the valve after a predetermined opening.

14. In a device of the class described the combination of an air inlet and a mixture outlet valve, a link connecting the same within the device for simultaneous operation, a fuel valve, actuating means for said valves, and an adjustable cam mechanism between said fuel valve and the other valves to effect a simultaneous movement of each.

15. In a device of the class described the combination of a fuel valve, a mixing chamber, inlet and outlet valves therein, a link pivotally connecting the same and disposed within said mixing chamber, a lever for actuating said connected valves, a cam connected therewith, means adjusting said cam, and an actuating lever for the fuel valve adapted to be operated by said cam.

16. In a device of the class described the combination of a mixing chamber, individual inlet and outlet valves therein, a link within the mixing chamber pivotally connected to said valves, a shaft on which said outlet valve is secured, a cam on said shaft, means adjusting the cam to vary the eccentricity thereof relative said shaft, an actuating lever on said shaft, a fuel valve communicating with the mixing chamber, and an actuating lever therefor adapted to contact said cam to insure simultaneous movement of said connected valves and said fuel valve.

17. In a device of the class described the combination of a mixing chamber, an outlet valve therefor, a shaft supporting the same, an adjustable cam on said shaft, an actuating lever on said shaft, a fuel valve, a lever for actuating the same, adjustable means on said lever adapted to contact said adjustable cam to cause movement of the fuel valve with movement of said outlet valve, an inlet valve for said mixing chamber beneath said outlet valve, and a link within said mixing chamber connected to said respective inlet and outlet valves for simultaneous operation thereof.

18. In a device of the class described the combination of a mixing chamber, an inlet valve therefor, actuating means pivotally connected thereto and disposed within said mixing chamber, a fuel valve, operating mechanism connected thereto, and an adjustable cam connected between said inlet valve actuating means, and said fuel valve operating mechanism, to insure movement of the latter with movement of the former.

19. In a carbureter a fuel nozzle, a constantly open inlet air port adjacent thereto, a valve for controlling the flow of mixture from the carbureter and also the draft therethrough, an air valve, means disposed on the interior of the carbureter connected to said air valve and to said controlling valve for simultaneous operation therewith to admit increased quantities of air with the opening of said controlling valve, so that substantially a uniform draft upon the fuel nozzle is effected at all adjustments, and operative connections between said connected valves and said fuel nozzle.

20. In a device of the class described a casing, a throttle valve therein, a lever for actuating the same, an adjustable cam connected with said lever, a needle fuel valve within said casing, a notched seat in the upper end of the needle valve, a shaft journaled transversely on said casing, an arm thereon engaging said notched seat in the needle valve, another arm secured on said shaft, and adjustable means at the end thereof bearing upon said cam.

21. In a carbureter of the class described, a mixture outlet, a throttle valve controlling the flow therethrough, a main air inlet port, a plurality of auxiliary air inlet ports, a valve in one of said auxiliary air inlet ports, operable by suction within the carbureter, a valve in the other of said auxiliary air inlet ports operable by movement of said throttle, a fuel inlet nozzle in said main air inlet port, means adjusting the same for different quantities of flow of fuel therethrough when said throttle is nearly closed, adjusting means operable by said throttle for varying the capacity of said nozzle as said throttle is opened, and means for altering the ratio of movement between said adjusting means and said throttle.

In testimony whereof I have hereunto subscribed my name in the presence of two subscribing witnesses.

CHARLES L. RAYFIELD.

Witnesses:
WILLIAM J. BLACK,
C. W. HILLS.